United States Patent [19]

Monroe

[11] Patent Number: 4,599,654
[45] Date of Patent: Jul. 8, 1986

[54] DARK CURRENT ELIMINATOR USEFUL FOR AUTO-IRIS CONTROLLER

[75] Inventor: Thomas D. Monroe, Lititz, Pa.

[73] Assignee: RCA Corporation, Princeton, N.J.

[21] Appl. No.: 666,781

[22] Filed: Oct. 31, 1984

[51] Int. Cl.[4] .................... H04N 5/238; H04N 5/228
[52] U.S. Cl. .................................. 358/228; 358/221; 358/213
[58] Field of Search ............... 358/221, 228, 213, 161, 358/34, 172

[56] References Cited

U.S. PATENT DOCUMENTS

| | | | |
|---|---|---|---|
| 3,180,934 | 4/1965 | Altman et al. | 178/7.2 |
| 4,158,859 | 6/1979 | Kerbel | 358/228 |
| 4,268,866 | 5/1981 | Rodgers, III | 358/228 |
| 4,318,132 | 3/1982 | Machida | 358/228 |
| 4,327,378 | 4/1982 | Tanaka et al. | 358/228 |
| 4,369,466 | 1/1983 | Matsuzaki et al. | 358/172 |
| 4,399,466 | 8/1983 | Stephenson | 358/221 |
| 4,516,172 | 5/1985 | Miyata et al. | 358/211 |

FOREIGN PATENT DOCUMENTS 3314299 5/1984 Fed. Rep. of Germany .

OTHER PUBLICATIONS

Motorola Service Manual entitled "Intensified Low Light Level Cameras" Models: V14006A and V14007A published 8/82.

Primary Examiner—Gene Z. Rubinson
Assistant Examiner—Stephen Brinich
Attorney, Agent, or Firm—Eugene M. Whitacre; Peter M. Emanuel; Lawrence C. Edelman

[57] ABSTRACT

Commercially available automatic iris lens assemblies typically respond to the peak-to-peak level of the video signal supplied from the imager, for controlling the amount of light imaged thereon. For preventing the dark current component of the video signal from undesirably reducing the dynamic control range of the iris control, the video signal is modified before it is applied to the automatic iris lens assembly. The modification comprises shifting the average value of the video signal to a given level approximating the average level of a normal video signal and then setting the levels of the blanking portions to the given level.

11 Claims, 4 Drawing Figures

DARK CURRENT ELIMINATOR USEFUL FOR AUTO-IRIS CONTROLLER

BACKGROUND OF THE INVENTION

The present invention relates to a circuit for controlling an automatic iris of a video camera, and more particularly, such a circuit with provisions for inhibiting dark current from effecting the iris control.

Surveillance, industrial and portable cameras, are used in an extremely wide range of environmental conditions in the normal course of operation. For example, a surveillance or portable camera may be subjected to high levels of illumination in the daytime and subjected to extremely low levels of illumination at night. The imagers used for such cameras include imaging devices such as pickup tubes (vidicons) and solid-state sensors such as charge coupled devices (CCD) and metal-oxide semiconductor devices (MOS). Such imagers have a relatively limited dynamic range as compared to the variation of illumination levels under which the camera is expected to operate. Consequently, to make maximum use of the imagers dynamic range, cameras typically include an iris comprising a mechanical diaphragm coupled in the optical path of the imager for controlling the amount of light passed through to the imager so that the imager operates within a preferred illumination range. The iris can be automatically controlled in a degenerative feedback loop manner in response to the level of the video signal supplied from the imager. One such automatic iris controller is described in U.S. Pat. No. 2,885,471 issued on May 5, 1959 in the name of G. King. The King arrangement generates an iris control signal in response to the peak-to-peak value of the video signal. Thus, when the imager views a scene containing highlights, i.e., high brightness portions of a scene, the iris controller senses the highlights and closes the iris to a level commensurate with the dynamic range of the imager, thereby providing adequate contrast in the region of the highlights.

In camera markets having a relatively high volume, such as the surveillance, industrial and consumer markets, it is desirable that a camera be adaptable for use with standard optical systems. Among the optical systems currently enjoying widespread use are automatic iris lenses such as the type manufacturered by Vicon Industries, located in Melville, New York and the Cosmicar Lens Division of Asahi Precision, Tokyo, Japan. As illustrated by element 20 in FIG. 2, the automatic iris control circuitry typically includes an input AC coupled to receive the video signal, a clamp for esablishing a given potential for the most negative portion of the video signal (typically the blanking portion) and a peak detector for developing a DC voltage representative of the video signal peaks (highlights). This DC signal is applied to control the iris opening.

As shown in FIG. 1, video signal 10 includes periodic blanking portions 12 corresponding to the horizontal retrace intervals of the television signal, interspersed with lines of image representative signal levels corresponding to active portions 14 of the television signal.

In addition to supplying the video signal, the pickup tube or solid-state imager supplies another component commonly referred to as "dark current". Dark current is a signal which is supplied by the imager even in the absence of light, mainly due to thermally generated electron-hole pairs in the imaging photosensitive surface. Typically, dark current comprises a DC signal level which causes the active video portion 14 of signal 10 to "ride on top of" a DC component ($V_{DC}$) dependent upon the level of dark current. When dark current component is relatively small, the automatic iris control circuitry is able to provide an iris control signal which can follow substantially the full dynamic range of amplitude variation of the active portion 14 of the video signal. However, the level of dark current accompanying a video signal increases with increases of temperature and when the camera is operated under environmental conditions having temperatures above room temperature, the dark current component can become a substantial portion of the video signal, such as indicated by waveform 16. Thus, the DC level of the active portion 14 of video signal 16 is significantly raised, yet the level of the blanking interval is relatively unaffected. This is so in pickup tubes because, during the blanking interval the cathode of the tube is biased to cut-off. Thus, there is no dark current output during this time. In solid-state imagers, the blanking interval level is also not dark current dependent because charges are not read-out during the blanking interval, either due to stopping of the read-out clock or due to the fact that all the charge samples for a given line have already been read-out.

Automatic iris control circuitry of the type described by King, clamps the most negative portion of signal 16, i.e. blanking portion 12, to a given value and peak detects the maximum level of active portion 14 of signal 16 for providing the DC iris control signal. Since almost half of the peak value of signal 16 does not correspond to image brightness variations, approximately 50% of the dynamic range of iris control can be lost to dark current under high temperature environmental conditions.

Therefore, it is desirable to eliminate the adverse reduction in iris control dynamic range caused by the dark current component of the video signal.

SUMMARY OF THE INVENTION

In accordance with the principles of the present invention the video signal is modified to effectively remove the dark current component before applying it to the automatic iris control circuitry. The modifying circuitry includes means for changing the average value of the video signal received from the camera to a first voltage level and a clamp selectively operable during the blanking intervals of the video signal for establishing a second voltage level for the blanking portion of the video signal. The second voltage level is substantially equal to the first voltage level. Consequently, the video signal DC level due to the dark current component is effectively removed from the video signal.

In accordance with a further aspect of the invention, for differentiating a low level video signal representative of a dark scene from a saturated video signal representative of a low contrast bright scene, the average value changing means changes the average value of a substantially saturated video signal to a third voltage level substantially greater than said second voltage level, thus insuring correct iris control operation under these conditions.

DETAILED DESCRIPTION

Figure 2:
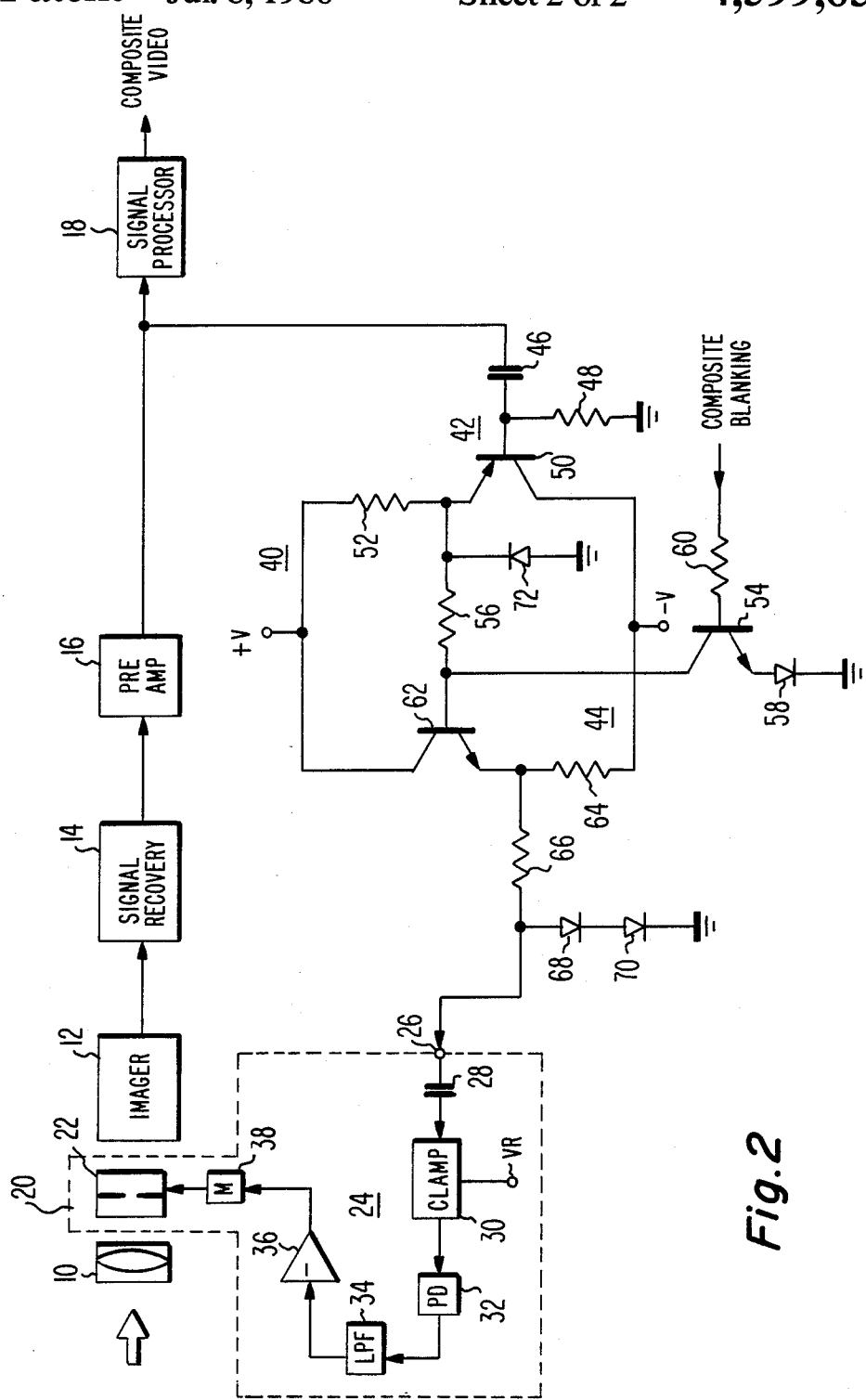
FIG. 2 illustrates partially in block and partially in schematic diagram form a preferred embodiment of the present invention.

In the video camera of FIG. 2, light reflected from a scene (represented by the arrow) is focussed by means of a lens 10 onto the photosensitive surface of an imager 12. The imager may comprise a conventional image pickup tube or a solid-state imager such as a charge coupled device (CCD) or metal-oxide semiconductor device (MOS). Video signals appearing at the output of imager 12 in response to the focused image, are applied by way of a signal recovery circuit 14 and a preamplifier 16 to a conventional signal processor 18 which provides a composite video signal at its output. Signal processor 18 typically includes circuitry for DC restoration, gamma correction and for adding blanking and sync signal components to the video signal.

An iris assembly 20, including a mechanical diaphragm 22 is located in the optical path between lens 10 and imager 12 for controlling the amount of light passed through to imager 12 so that it operates within a preferred range of illumination levels. For controlling diaphragm 22, iris assembly 20 includes detector circuitry 24 responsive to the video signal supplied from the imager 12 for controlling in a degenerative feedback loop manner the amount of light passed by mechanical diaphragm 22. More specifically, detector circuitry 24 includes an input 26 for receiving the video signal. A capacitor 28 couples the video signal from input 26 to a signal clamp 30 which establishes a given reference voltage level ($V_R$) i.e., ground potential or a slightly positive voltage, for the minimum level or most negative portion of the video signal, i.e. the blanking portion. A peak detector 32 receives the clamped video signal from clamp 30 and detects the maximum level or most positive signal excursion, which occurs during the active interval of the video signal, and develops a DC voltage representative of the video signal highlights. Thus, the combination of clamp 30 and peak detector 32 essentially comprises a peak-to-peak signal detector. A low pass filter 34 is coupled to the output of peak detector 32 for providing a DC signal representative of the peak detected video signal. An inverting amplifier 36 is coupled to the output of low pass filter 34 for driving an iris control motor 38 for controlling the iris opening of diaphragm 22 inversely in response to the video signal level. Due to the negative feedback nature of the iris controller, a relatively constant average value is maintained for the video signal at the output of imager 12. Reference voltage $V_R$ applied to clamp 30 can be adjusted during manufacture to set the iris opening for establishing a specific DC level for the video signal provided at the output of preamplifier 16, for a predetermined amount of illumination. Iris assembly 20 may comprise a commercially available unit such as model number V106AC produced by the forenoted VICON Industries.

Figure 1:
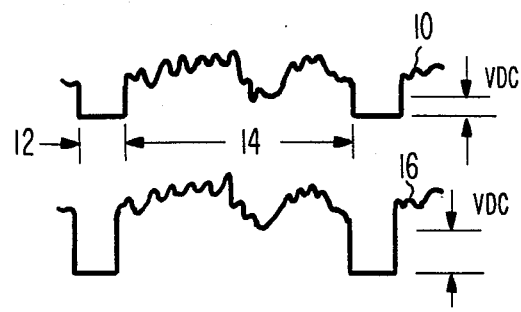
FIG. 1, previously described, illustrates video signal waveforms useful in understanding the problem solved by the present invention.

As previously noted, at times when there is a substantial dark current component, such as illustrated in FIG. 1 by signal 16, peak detecting iris control circuitry of the type included in iris assembly 20 operates with a substantially reduced dynamic range. For example, if the dark current level was equal to half of the peak level of the video signal, approximately fifty percent of the dynamic range of iris control would be lost.

In accordance with the principles of the present invention, the video signal is modified in a modifying circuit 40 so as to effectively remove the dark current component from it before it is applied to auto iris assembly 20.

Modifying circuit 40 includes a DC shifting circuit 42 for shifting the average video signal level (also referred to as the average picture level or APL) to a first level, and a blanking level clamp 44 for clamping the level of the blanking portions of the video signal to a second level which is between the maximum and minimum levels of the active interval of the shifted average value video signal. In the illustrated embodiment the second level is substantially equal to the first level.

Figure 3:
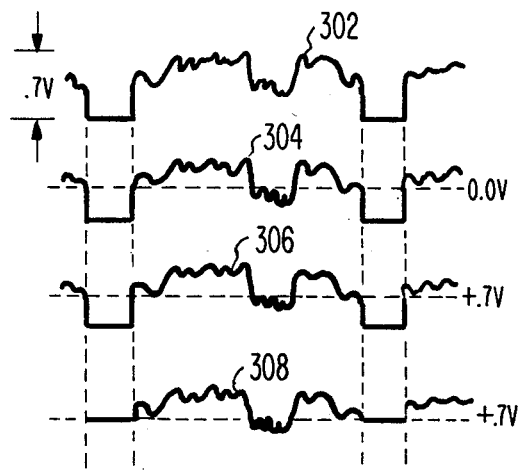
FIG. 3 illustrates waveforms useful in understanding the operation of the invention.

More specifically, DC shifting circuit 42 includes an AC coupling means, such as capacitor 46, having one plate coupled to receive the video signal applied from preamplifier 16, illustrated by waveform 302 of FIG. 3, and the other plate coupled to ground via a resistor 48 and to the base electrode of a transistor 50. The effect of capacitor 46 and resistor 48 is to shift the average value of the video signal applied to transistor 50 to ground. This is illustrated in FIG. 3 by comparing waveforms 302 and 304. Transistor 50 is arranged as an emitter follower with its collector-emitter path coupled between a source of operating potential $+V$ and $-V$ and includes an emitter resistor 52 across which a DC shifted video signal is developed. The video signal developed at the emitter of transistor 50 is illustrated by waveform 306 and is the same as waveform 304 except that its average value is shifted up by the DC voltage developed across the PN junction of the emitter of transistor 50, i.e., approximately $+0.7$ volts. Note that $+0.7$ volts is also the peak-to-peak signal variation for the normal video signal illustrated by waveform 302.

Clamping circuit 44 includes a transistor 54 having its collector electrode coupled to one end of a resistor 56, the other end of resistor 56 being coupled to the emitter of transistor 50, and its emitter electrode coupled to ground via a diode 58. Composite blanking signals are applied to the base electrode of transistor 54 via a resistor 60 for rendering transistor 54 conductive during the horizontal and vertical blanking intervals of the video signal. When transistor 54 is conductive, the anode of diode 58 is coupled to resistor 56 for clamping the video signal to a predetermined level. In particular, diode 58 is poled to shift the video signal level during the blanking intervals (i.e., when transistor 54 is rendered conductive) to a level of approximately $+0.7$ volts. As previously noted, the average level of the video signal was shifted by DC shifting circuit 42. The resultant video signal is illustrated by waveform 308. It is noted that the blanking level of the resultant video signal illustrated by waveform 308 is between the maximum and minimum excursions of the active portion of the video signal. When the video signal is so modified, detector circuit 24 of iris assembly 20 sets the most negative portion of the video signal to $V_R$ and peak detects the most positive portions. As a result, a DC signal which is accurately representative of the maximum excursion of the active portion of the video signal is generated for controlling iris motor 38 and the dark current component is prevented from reducing the dynamic range of the iris control.

An emitter follower transistor 62 receives the modified video signal at its base electrode and supplies it to input 26 of iris assembly 20 via a resistor 66 coupled to its emitter resistor 64. A white clipper circuit consisting of series coupled diodes 68 and 70 is coupled between the input terminal 26 and ground for limiting the positive (white going) excursions of the video signal to about +1.4 volts, corresponding to an approximately two times white video signal level. This is done to minimize disturbances to the loop from bright highlights.

Figure 4:
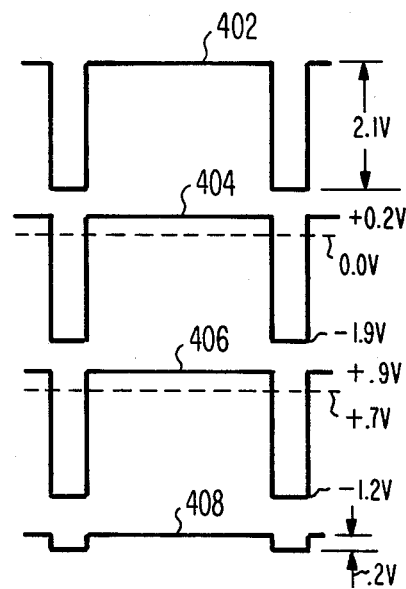
FIG. 4 illustrates waveforms useful in understanding the operation of a further aspect of the invention.
Figure 4:
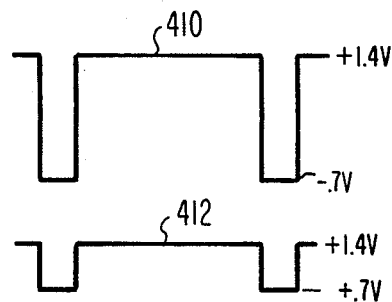

The invention as described so far is extremely effective for preventing dark current from limiting the dynamic range of normal video signals. However, it is possible that under some video signal conditions, the iris may "latch-up" i.e., be held at a position which is erroneous. In particular, this situation may occur when the video signal is saturated, i.e., substantially all of its signal level during the active picture interval is at peak white. This type of signal is illustrated in FIG. 4 as waveform 402. Note that signal 402 is substantially at the maximum level during the entire active interval and that the peak-to-peak signal level is approximately 2.1 volts, which is three times the normal peak-to-peak video signal level (+0.7 volts). When this signal is reproduced, there will be little or no contrast or picture information. Thus, the iris opening must be reduced to attempt to restore adequate contrast to the video signal.

As in the case of a normal video signal (i.e., one that is not saturated), capacitor 46 and resistor 48 shift the average value of signal 402 to 0 volts as illustrated by waveform 404. Note that the average value of the saturated video signal is close to its maximum value. This signal is further shifted by transistor 50 so that its average value is +0.7 volts as illustrated by waveform 406. Transistor 54 and diode 58 clamp the blanking intervals to +0.7 volts (the average video signal level of a normal video signal), resulting in a signal, as illustrated by waveform 408, being applied to iris assembly 20. Since signal 408 has a relatively small peak-to-peak variation, detector 24 may not provide an iris control signal of sufficient magnitude to reduce the iris opening (which is required for restoring adequate contrast to the video signal) thereby resulting in the aforenoted "latch-up" situation.

In accordance with a further aspect of the present invention, DC shifting circuit 42 includes a selectively conductive element for additionally modifying the video signal if it is substantially saturated. More particularly, a diode 72 is coupled between the emitter of transistor 70 and ground potential and poled to be rendered conductive by the negative going blanking portions of video signal 404. As a result of the conduction of diode 72 during recurrent blanking intervals of the video signal, a current flows from diode 72 through the emitter-base junction of transistor 50 to capacitor 46 which gradually builds up a charge on capacitor 46 which additionally shifts the average value of the saturated video signal. This additional shifting of the average value of the video signal is illustrated as waveform 410 in FIG. 4. Note the level of the blanking intervals is clamped at −0.7 volts due to the conduction of diode 72. Consequently, when clamping circuit 44 substitutes a level for the blanking level which is representative of the average video signal level for a normal video signal, i.e., +0.7 volts, the resulting signal, illustrated as waveform 412, has a peak-to-peak amplitude which can be recognized by detector 24 of iris assembly 18 to be representative of a white scene. Consequently, the iris controller reduces the iris opening and "latch-up" is prevented. It should be noted that the signals illustrated in FIGS. 1, 3 and 4 have been exaggerated for clarity of presentation and the voltage levels indicated therein are merely illustrative.

Although a preferred embodiment of the invention has been described, other embodiments are possible and considered to be within the scope of the invention. For example, the DC shifting circuit 42 does not require a series coupled AC input and could have other level shifting means instead, such as a current mirror type of circuit. Furthermore, the principles of the invention can be applied to a camera having more than one imager such as a three imager color camera. In this case, a non-additive mixer can be used to select the video signal having the instantaneously highest level, as the video signal to be applied to the video signal modifying circuit for use in iris control. These and other modifications are considered to be within the scope of the invention defined by the following claims.

What is claimed is:

1. A video camera comprising:
   a lens for imaging a scene;
   image transducing means including an imager for supplying a video signal having recurrent blanking intervals interspersed with active picture intervals having a range of amplitude variations representative of bright and dark portions, respectively, of said imaged scene;
   an iris located between said lens and said imager for controlling the amount of light imaged onto said imager;
   iris control means, responsive to a peak level of said video signal for controlling the iris in a degenerative feedback manner so as to control the light imaged onto said imager; and
   video signal modifying means coupled to be responsive to the video signal for modifying the video signal applied to said iris control means, said modifying means including means for setting the level of said blanking portions of said video signal to a given level, said given level being a level within the range of amplitude variations of the active picture interval of the video signal applied to said modifying means.

2. The camera of claim 1 including an average value shifting means, responsive to said video signal supplied from said image transducing means, for providing a video signal to said modifying means having a shifted average value.

3. The camera of claim 2 wherein said average value shifting means changes the average value of said video signal to a first level, said first level being substantially equal to said given level.

4. The camera of claim 2 wherein said average value shifting means comprises a capacitor coupled to receive said video signal followed by a level shifting circuit for shifting the average value of said video signal to substantially equal said given level.

5. The camera according to claim 3 wherein said average value shifting means further comprises selectively conductive biasing means responsive to said video signal for shifting the average value of said video signal to a level substantially different from said first level when substantially all of said active portion of said video signal is representative of a bright scene.

6. In a video camera including an image transducing means for supplying a video signal representative of a scene imaged onto a photosensitive surface thereof, said video signal including recurrent blanking portions and active portions located between adjacent blanking portions having amplitude levels which vary in response to the amount of light in corresponding portions of said image scene; a lens for imaging said scene onto said photosensitive surface, an automatic iris located between said lens and said image transducing means, said iris including a signal level detector responsive to said video signal for controlling the amount of light imaged onto said photosensitive surface in accordance with a detected peak level of said video signal, and a modifying circuit coupled to be responsive to said video signal for modifying the video signal supplied to said automatic iris, said modifying circuit comprising:

average value shifting means having an input responsive to said video signal and an output for supplying said video signal with a shifted average value and having amplitude excursions within a range between maximum and minimum levels for the active portion of normal video signals;

a direct current coupled signal path coupled to the output of said average value shifting means for supplying said shifted average value video signal to said iris detector, and a selectively operable voltage establishing means coupled to said direct current coupled signal path for establishing a predetermined voltage level for said recurrent blanking portions of said video signal, said predetermined voltage level being a level between said maximum and minimum levels.

7. The camera of claim 6 wherein said average value shifting means changes the average value of said video signal to a first voltage level, said first voltage level being substantially equal to said predetermined voltage level.

8. The camera of claim 6 wherein said average value shifting means comprises a capacitor coupled to receive said video signal to be modified followed by a level shifting circuit for shifting the average value of said video signal to substantially equal said predetermined voltage level.

9. The camera according to claim 8 wherein said average value shifting means further comprises selectively conductive biasing means coupled to said direct current coupled signal path and responsive to said video signal for shifting the average value of said video signal to a level substantially different from said predetermined level when substantially all of said active portion of said video signal is at said maximum level.

10. The camera of claim 9 wherein said selectively conductive biasing means comprises a diode having one end coupled to said direct current coupled signal path and the other end coupled to receive said first voltage level and poled to be rendered conductive during the blanking intervals of said video signal when substantially all of the active portion of said video signal is at said maximum level.

11. The camera of claim 10 wherein said selectively conductive biasing means is coupled to said capacitor for shifting the average value of said video signal by charging said capacitor when it is selectively rendered conductive.

* * * * *